Jan. 12, 1932. M. J. DE MASK 1,840,887
FITTING FOR MULTIPLE ELECTRIC INSTALLATIONS
Filed Aug. 7, 1930 2 Sheets-Sheet 1
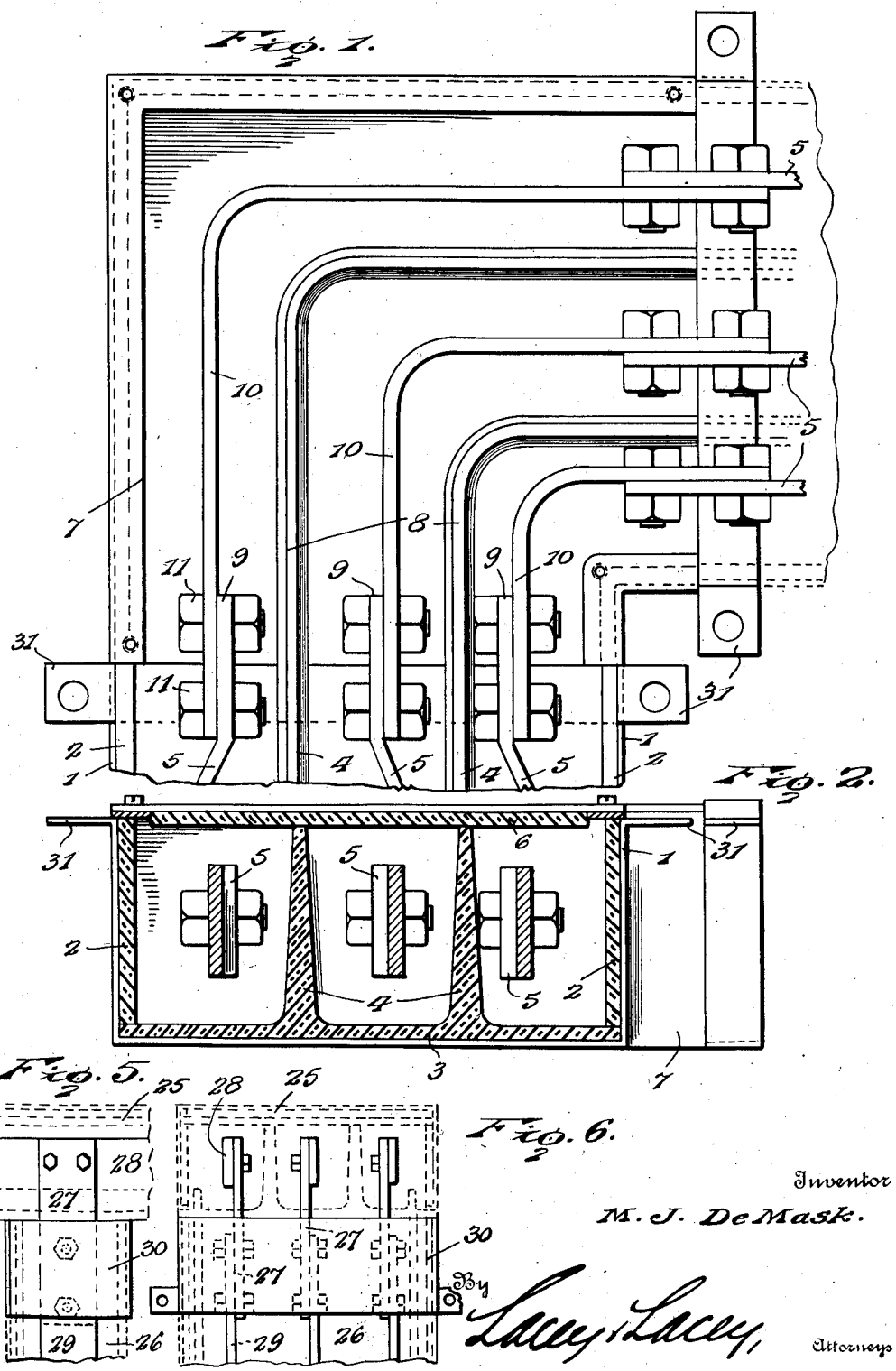

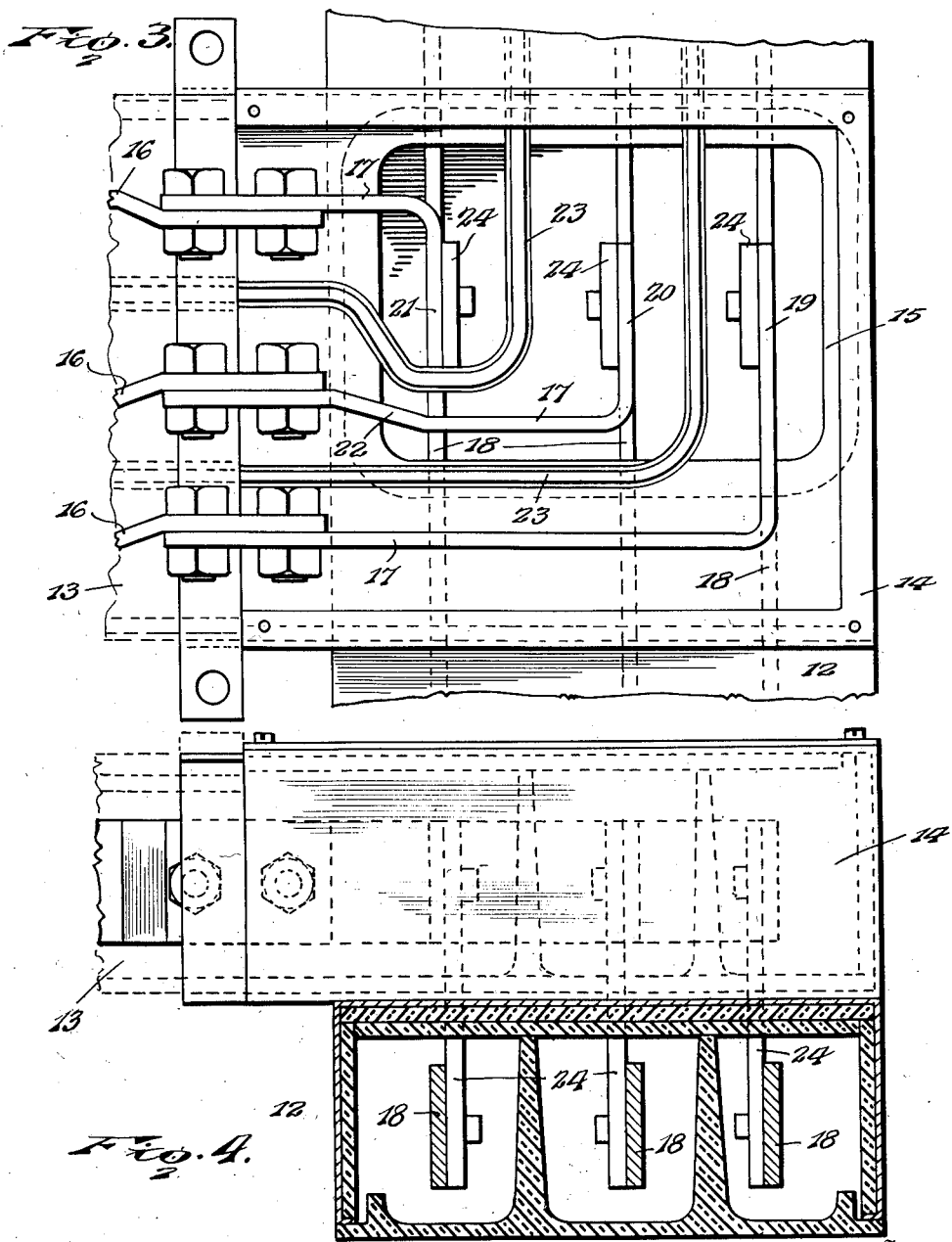

Patented Jan. 12, 1932

1,840,887

UNITED STATES PATENT OFFICE

MARTIN J. DE MASK, OF PITTSFIELD, MASSACHUSETTS

FITTING FOR MULTIPLE ELECTRIC INSTALLATIONS

Application filed August 7, 1930. Serial No. 473,617.

The present invention relates to conduits for electrical installations and has special reference to fittings for connecting the ends of conduits which do not extend in alinement, the object being to provide means whereby the several feeder bars will be electrically insulated from each other and which means will be simple and inexpensive and easily secured in place. The invention is illustrated in the accompanying drawings and will be hereinafter fully set forth and particularly defined.

In the drawings:

Figure 1 is a plan view of an elbow connection between the ends of conduits which are arranged at a right angle to each other, Fig. 2 is a section through the elbow fitting, Fig. 3 is a plan view of a fitting for connecting a branch conduit to a main conduit in a T form, Fig. 4 is a view, partly in side elevation and partly in transverse section, of the structure shown in Fig. 3, and Figs. 5 and 6 are elevations taken at right angles to each other of a vertical T connection.

Referring to Figure 1 more particularly, the reference numeral 1 indicates a metallic casing or conduit at the ends of which are ears 31 through which fastening devices are inserted into a ceiling or a side wall to secure the conduit firmly thereon. When an elbow is placed in position at the ends of conduits, the ears 31 are directly under the hanger bar on the end of each length of conduit, the hole in each ear alining with a hole in the hanger bar and the tie rod which holds the end of the conduit also aids in holding the elbow fitting in place. As indicated in Fig. 2, the conduit is equipped with a lining of insulation which comprises side walls 2 and a bottom wall 3 which is provided on its inner side with longitudinal barriers 4 which define separate channels or chambers in which the respective bus bars or feeder bars 5 are located. The back or top of the elbow fitting is open but covered with plates 6 which are secured upon the fitting so as to facilitate access to the interior of the conduit and the connecting of feed bar sections without requiring the removal or dismantling of the conduit. The feeder or bus bars 5 are supported in the conduit in any convenient or preferred manner. The exigency of installation frequently requires that stretches of the conduits be disposed along meeting sides of a room and in various relative positions and it is necessary to provide some means for connecting the several sections or stretches of the conduits. In Fig. 1 is illustrated an elbow connection for coupling the ends of conduits which are disposed upon the same wall or in the same plane but at a right angle to each other, as shown. To connect these sections, I provide an intermediate casing or elbow 7 which is of right angular form when seen in plan view, as in Fig. 1, and which includes barriers or ribs 8 of insulation, said ribs having their respective ends disposed at a right angle to each other and arranged to aline with the ribs or barriers 4 of the conduit sections. The ends of the feeder bars 5 project from the ends of the respective conduits into the meeting ends of the elbow casing 7, as clearly shown in Fig. 1, and the feeder bars projecting from one conduit section are offset, as shown at 9, whereby they may be caused to overlap the meeting ends of similar bars 10 which extend through the elbow casing, the feeder bars 10 being firmly secured to the ends of the feeder bars 5 by bolts 11 fitted through the overlapped ends of the bars, as clearly shown in Figs. 1 and 2. The bars 10 are not connected to the elbow casing but are supported solely by the bolts 11 and, consequently, the necessary connections may be very promptly and easily made. The cover 6 which has been mentioned may have its ends secured upon the respective conduit sections but it extends over the elbow casing 7 so that the several connections will be completely housed and accidental contact therewith will be thereby prevented.

In Figs. 3 and 4, I have illustrated the application of the present invention to the coupling of a branch conduit which is disposed at a right angle to a main conduit and at a point intermediate the length of said conduit. The main conduit 12 is constructed in all essential respects as the conduits 2, previously described, and the branch conduit 13 is of the same construction while an intermediate coupling casing 14 is disposed in alinement with the branch casing 13 and on top of the main casing or conduit 12, as shown in Fig. 3. The intermediate or coupling casing 14 is open at the side presented to the main conduit 12 and extends over a hand-hole 15 formed in the top or outer side of said main conduit, being secured in place by screws inserted through its bottom plate into screw holes provided near the corners of the hand-hole. The bus bars or feeder bars 16 in the branch conduit 13 have rigidly secured to their ends extension bars 17 which are carried into the intermediate or coupling casing 14 and have their ends bent so that they may be alined with and disposed over and extend longitudinally of the respective bus or feeder bars 18 in the main conduit, the terminals of the feeder bars 17 being shown at 19, 20 and 21, respectively. The bar having the terminal 19 is merely extended across practically the entire length of the casing 14 and is then bent sharply at a right angle toward the opposite side of the casing while the intermediate bar 17 is first bent slightly, as shown at 22, to clear the center of the casing and is then bent parallel with the terminal 19 so as to be disposed directly over a feeder bar 18 in the main conduit, while the bar 17 at the upper side of Fig. 3 is bent sharply in the opposite direction to the terminals 19 and 20, as shown. This bending of the extension bars 17 is desirable in order to permit a secure coupling of the same with the respective feeder bars 18 of the main conduit and also prevent interference between the several bars. The intermediate casing is provided with barriers 23 of insulation disposed to form continuations of the barriers of the branch casing 13 and extended on lines which are always between adjacent extension bars 17 so that the several feeder bars and their connections will be completely insulated from each other. Coupling plates 24 extend through the top of the main conduit 12 and the bottom of the coupling casing 14 and are rigidly bolted or otherwise secured at their lower ends to the feeder or bus bars 18 and at their upper ends to the terminals of the respective extension bars 17 so that a good electrical connection between the main feeder bars and the branch feeder bars will be effected.

In Figs. 5 and 6 is illustrated an arrangement in which the main conduit 25 extends across the end of the branch conduit 26, coupling bars or plates 27, similar to the coupling plates 24, being provided to connect the feeder bars 28 in the main conduit with the feeder bars 29 in the branch conduit, the arrangement being substantially the same as shown in Figs. 3 and 4, but it being unnecessary to bend the feeder bars and the insulating barriers of the branch conduit or the intermediate coupling conduit 30 out of straight lines.

From the foregoing description, it will be seen that I have provided a very simple mechanism whereby branch conduits may be very quickly and conveniently connected to main conduits and good electrical connections made between the several conductors.

Having thus described the invention, I claim:

1. The combination with conduit sections having feeder bars therein and provided with barriers of insulation between adjacent feeder bars, of a coupling casing disposed across one conduit section and having barriers therein arranged to aline with barriers in intersecting conduit sections, extension bars secured to the feeder bars in one of the intersecting conduit sections, and means for connecting the opposite ends of the extension bars with the feeder bars in another intersecting conduit section.

2. The combination of intersecting conduit sections each having feeder bars therein and provided with barriers of insulation between adjacent feeder bars, of a coupling section disposed across the end of one conduit section and having barriers therein arranged to aline with the barriers in the intersection conduit sections, extension bars secured to the ends of the feeder bars in one conduit section and disposed over and in alinement with the feeder bars in the intersecting conduit section, and coupling plates secured to and connecting the feeder bars in the last-mentioned section and the said extension bars.

In testimony whereof I affix my signature.

MARTIN J. DE MASK. [L. S.]